Patented Nov. 25, 1952

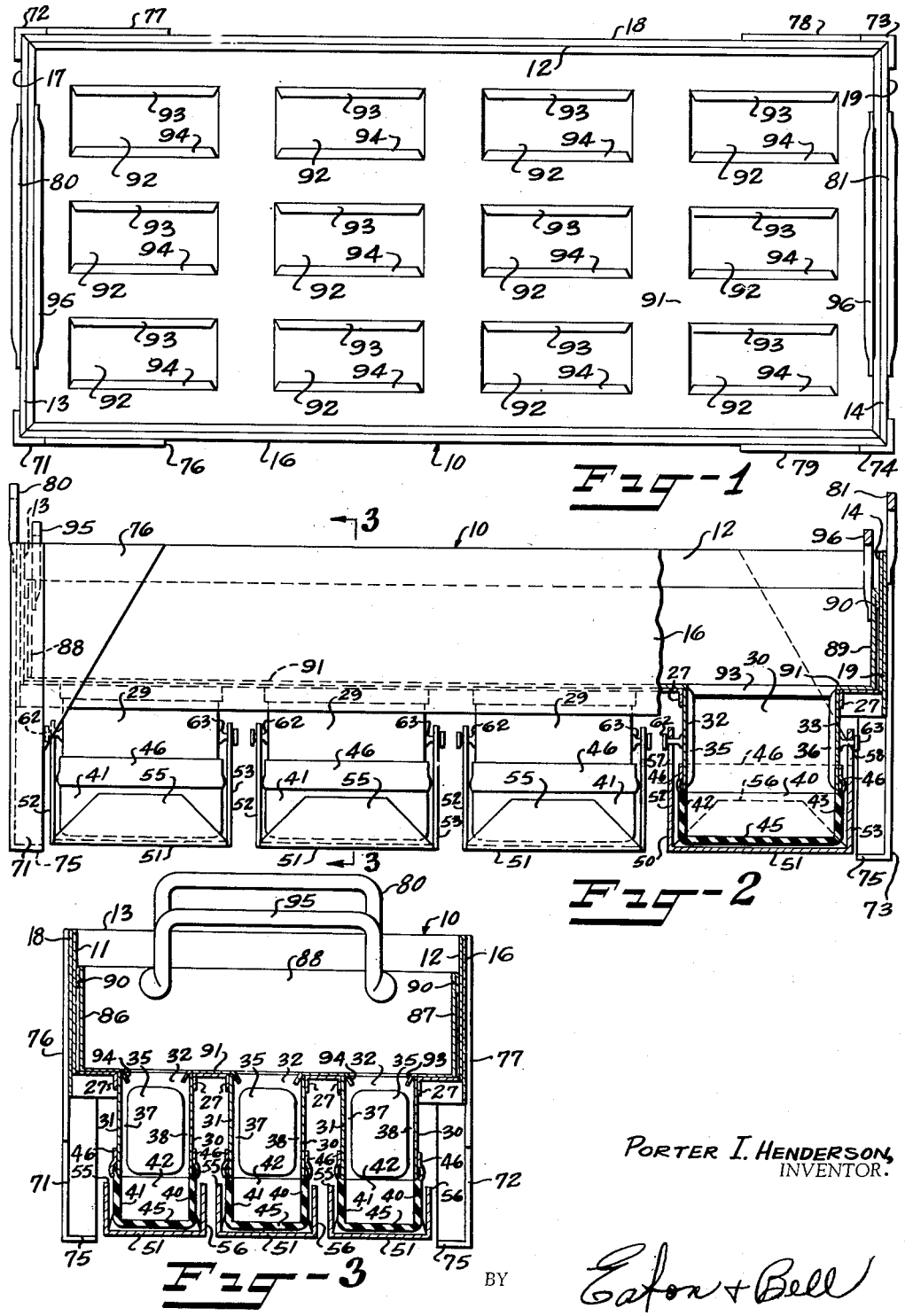

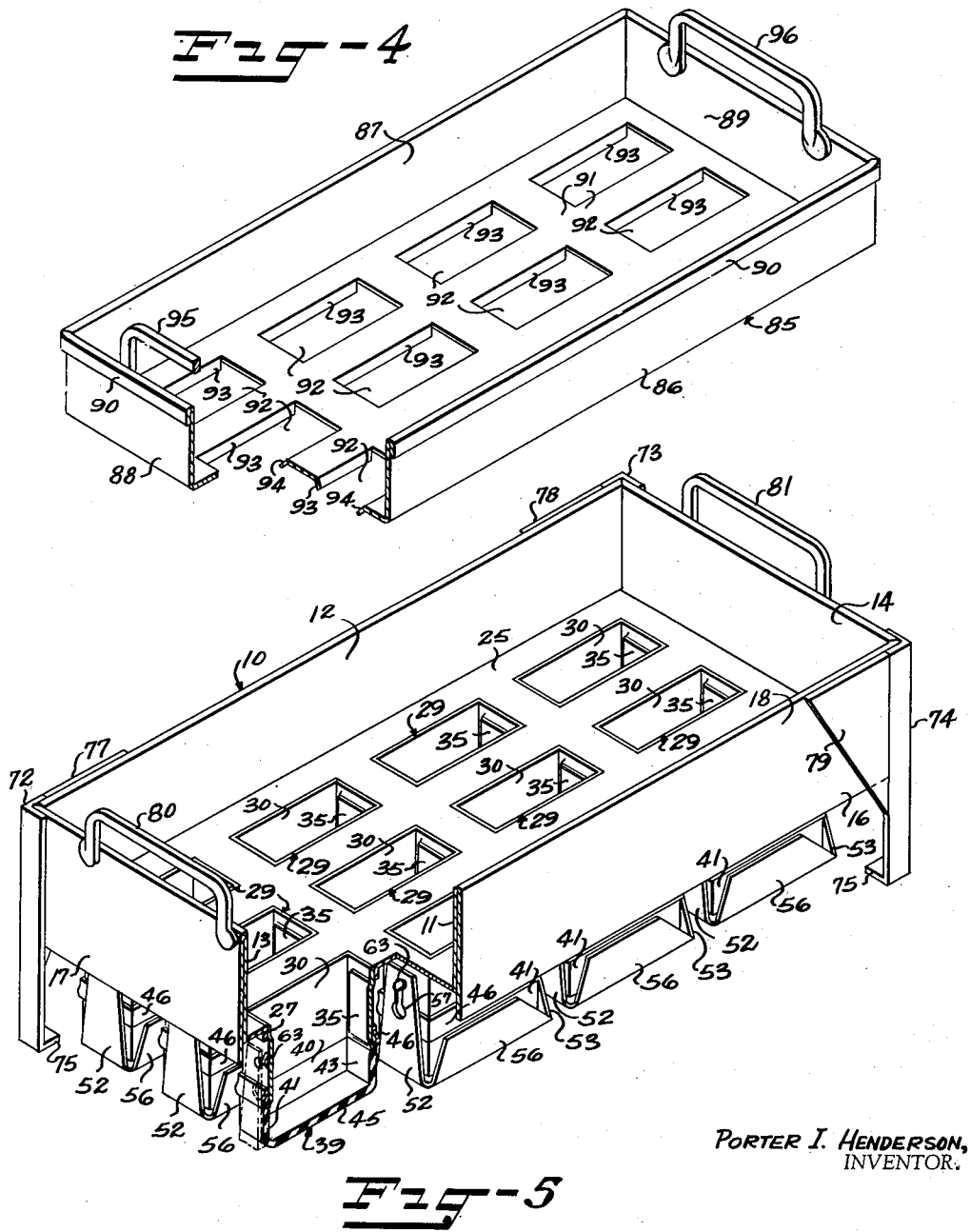

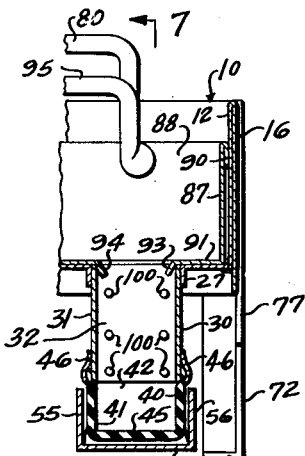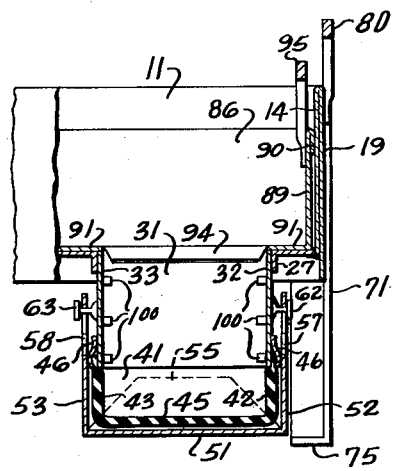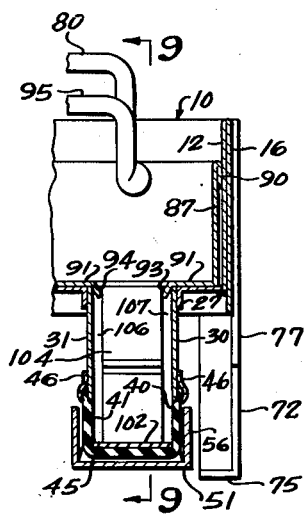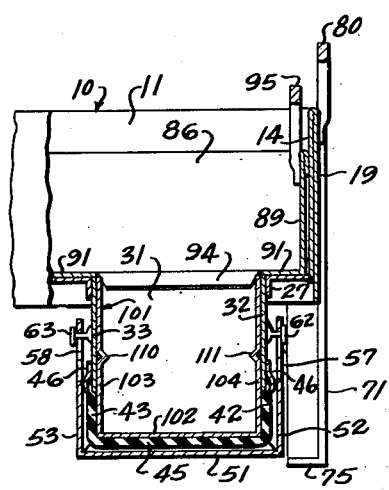

2,619,046

UNITED STATES PATENT OFFICE 2,619,046

APPARATUS FOR FORMING CONFECTIONS

Porter I. Henderson, Charlotte, N. C.

Application March 14, 1950, Serial No. 149,584

7 Claims. (Cl. 107—1)

This invention relates to the art of making frozen confections and more especially to apparatus for making ice cream sandwiches and the like.

Heretofore, in making ice cream sandwiches, it has been necessary to freeze the ice cream and cut the same into blocks of predetermined size after which wafers were applied to opposed sides of each of the ice cream blocks to form the ice cream sandwich. Most of this procedure had to be performed by hand and, as a result, was slow, expensive and unsanitary.

It is, therefore, an object of this invention to provide apparatus for making frozen confections such as ice cream sandwiches in which the sandwiches are formed as a single unit, the freezing and assembling operation taking place at the same time, and to permit the sandwiches to be formed without being touched by human hands.

It is another object of this invention to provide a mold for forming ice cream sandwiches, said mold having a plurality of compartments, each of said compartments having means therein for holding a pair of wafers in spaced relation to each other to permit the ice cream or other ingredients in a liquid or semi-frozen state to be placed between the spaced wafers in each compartment and said mold also being provided with means thereon to permit the entire mold to be moved through a freezing medium, such as brine, to thus freeze the ice cream and the wafers in each compartment into a single unit sandwich.

It is another object of this invention to provide a mold for making ice cream sandwiches of the type described, wherein the mold has a plurality of compartments and wherein a pair of wafers may be placed in each compartment in spaced relation to each other and fluid or semifluid ice cream may be placed between the wafers and the mold may be passed through a freezing medium to freeze the wafers and the ice cream into a single unit sandwich. The mold also has means thereon for removing said ice cream sandwiches, after they have been frozen, from the respective compartments of the mold and said removing means being operable without the necessity of applying heat to the mold and being so constructed as to permit the sandwiches to be removed from the mold without damaging the same.

It is another object of this invention to provide a mold of the type described having a filling tray adapted to be associated therewith, said tray having a plurality of openings therein adapted to coincide with the compartments in said mold and each of said openings in said tray being provided with down-turned lip portions adapted to fit over the upper edges of wafers disposed in the compartments in said mold whereby fluid or semi-fluid material, such as ice cream and the like, may be poured onto the tray and the openings in the tray will permit the ice cream to fill the compartments in the mold and the down-turned flanges of the tray extending over the wafers will cause the ice cream to flow only between the spaced wafers and will thus prevent ice cream from flowing between the wafers and the walls of the compartments.

More specifically, it is an object of this invention to provide a mold for forming a frozen ice cream sandwich comprising said mold having a plurality of compartments, each of said compartments having means therein for holding a pair of wafers in spaced relation to each other and against the side walls of the respective compartments, the lower portion of each of said compartments having a cup-like member constructed of a resilient material, such as rubber or the like, secured thereto and being provided with a rigid shield slidably secured to the outer surface of the compartment and encasing said resilient member, and said mold also being provided with legs extending from the lower surface thereof to a point past the bottoms of said compartments to permit said mold having the legs thereon to be placed on a pair of rails or on a suitable conveyor and moved through a tank of brine or other refrigerant to freeze the contents of the mold.

Normally, the resilient cup-like member of each compartment assumes the desired shape of the sandwich to be molded. However, the rigid shields may be moved against the resilient members after the ice cream is frozen to partially collapse the same for ejecting the sandwich from the mold.

Some of the objects of the invention having been stated, other objects will appear as the description proceeds, when taken in connection with the accompanying drawings in which—

Figure 1 is a top plan view of the molding apparatus showing the filling tray therein;

Figure 2 is a side elevation of the apparatus shown in Figure 1 with parts broken away and showing one of the compartments in section;

Figure 3 is a vertical sectional view taken substantially along the line 3—3 in Figure 2;

Figure 4 is an isometric view of the filling tray removed from the molding apparatus with one corner broken away and shown in section;

Figure 5 is an isometric view of the molding apparatus with the filling tray removed therefrom and also showing one corner broken away and part of the same in section;

Figure 6 is a fragmentary vertical sectional view similar to the right-hand portion of Figure 3 but showing a modified means for holding wafers in spaced relation within a compartment;

Figure 7 is a fragmentary vertical sectional view of the modified form of the compartment and is taken substantially along the line 7—7 in Figure 6;

Figure 8 is another fragmentary vertical sectional view similar to the right-hand portion of Figure 3 but showing another modified form of means for holding the wafers in spaced relation within each compartment;

Figure 9 is a fragmentary vertical sectional view of the modified form shown in Figure 8, and being taken substantially along the line 9—9 in Figure 8.

Referring more specifically to the drawings, the numeral 10 broadly designates a mold which is shown as being substantially rectangular in shape but which may be of any desired shape and which has side walls 11 and 12 and end walls 13 and 14, the walls 11, 12, 13 and 14 are folded over on themselves to form respective outer walls 16, 17, 18 and 19. The ends of the side walls 11 and 12 are suitably secured, as by welding, to the ends of the respective end walls 13 and 14 to form the rectangular structure shown having walls of double thickness. It will be observed that the outer walls 16, 17, 18 and 19 extend downwardly a substantial distance beyond the bottom edges of the inner walls 11, 12, 13 and 14 to form a flange around the entire periphery of the mold, the purpose of which is to prevent any refrigerant, such as liquid brine, which may have adhered to the exterior surfaces of the compartments, to be presently described, when the mold was passed through the refrigerant, from entering the area defined by the walls 12, 13, 14 and 15 when the mold 10 is inverted for removing the contents thereof in a manner to be later described.

A bottom 25 is suitably secured, as by welding, to the lower edges of the inner walls 11, 12, 13 and 14. The bottom 25 has a plurality of substantially rectangular openings 26 therein, each of which is provided with downwardly extending flanges 27 to which the walls of individual compartments broadly designated at 29 are suitably secured.

It is evident that although twelve compartments 29 are shown for purposes of illustration, any desired number of compartments may be formed in the molding apparatus if desired.

Each of the compartments 29 is constructed in an identical manner and is adapted to receive a pair of wafers and ice cream for forming an ice cream sandwich and the same reference characters will apply to each compartment.

Each compartment has side walls 30 and 31 and end walls 32 and 33 having their respective upper edges secured, as by welding, to the downwardly extending flanges 27 of the bottom 25. In the original form of the invention, the end walls 32 and 33 have projections 35 and 26 thereon, respectively, said projections being spaced apart from the side walls 30 and 31 to form channels or grooves 37 and 38 for the reception of suitable wafers, not shown.

The lower portion of each compartment 29 is provided with a resilient cup-like member 39 molded from any suitable material such as rubber and having side walls 40 and 41 and end walls 42 and 43 and a bottom 45. The upper edges of the walls 40 to 43, inclusive, are secured to the lower edges of the walls 30 to 33, inclusive, of the compartment 29, by any suitable means such as fusing, or by splitting the lower portion of the walls 30 and 33, inclusive, and inserting the edges of the walls 40 to 43 therein and then clamping the split portions together. For purposes of illustration, the edges of the walls 40 to 43, inclusive, are shown secured to the lower portion of the walls 30 to 33, inclusive, respectively, by means of a strap member 46 suitably secured around the outer periphery of the compartment 29 and having its lower portion crimped inwardly to clampingly secure the upper edges of the walls 40 to 43, inclusive, to the outer surfaces of the walls 30 to 33, inclusive.

The resilient member forming the bottom of each compartment 29 is provided to permit the ice cream sandwich formed within the compartment to be removed therefrom by an operator applying pressure to the outer surface of the resilient portion of the compartment to partially collapse the same in order to eject the sandwich from the compartment.

The resilient member forming the lower part of the compartments 29 may be of sufficient strength to prevent the same from being moved sideways as they are partially collapsed and, consequently, breaking the wafers placed within the compartment. However, in order to further insure against damaging said wafers, there is provided a shield 50 for each compartment 29 which is substantially U-shaped and has a bottom 51 and upwardly extending legs 52 and 53. The shield 50 is also provided with side flanges 55 and 53 so that the shield will completely encase the resilient portion of the compartment 29.

The upwardly extending legs 52 and 53 of the shield 50 are each provided with vertically extending bayonet slots 57 and 58, respectively. A headed pin 62 is secured to the end wall 32 and a headed pin 63 is secured to the end wall 33. The heads of the pins 62 and 63 are adapted to slidably penetrate the respective enlarged portions of the bayonet slots 57 and 58 to permit the shield 50 to have vertical sliding movement on the pins 62 and 63. The heads of the pins 57 and 58 serve to hold the legs 52 and 53 in parallel relation to the end walls 32 and 33 of the compartment 29.

It shoud be observed that the shield 50 is of substantially the same shape as the compartment 29 but the shield 50 is slightly larger to permit the same to slide easily over the outside of the compartment and at the same time to protect the resilient member forming the bottom of each of the compartments 29.

The mold 10 is provided with a plurality of legs 71, 72, 73 and 74 secured to the respective corners thereof and extending downwardly to a point below the lower surface of the shield 50, each leg having a flat portion 75 on the lower surface thereof. Each of the legs 71 to 74, inclusive, has secured thereto a bracing member or gusset 76, 77, 78 and 79, respectively, the bracing members 76 to 79, inclusive, also being secured as by welding, to the respective outer side walls 16 and 18 of the mold 10.

Suitable handles 80 and 81 are secured to the outer surfaces of the end walls 17 and 19, respectively.

It is thus seen that I have provided a mold for ice cream sandwiches wherein a pair of wafers, not shown, and preferably being rectangular in shape, may be placed in the compartments 29 so the wafers will fit in the channels 37 and 38 and will be held in spaced relation to each other adjacent the side walls 30 and 31 of the compartments 29 by the projections 35 and 36 on the end walls of the compartments. Fluid or semifluid ice cream may then be poured into each compartment through the openings 26 to fill in the space between said wafers. The mold 10 may then be placed upon suitable rails, not shown, so that the posts 71 to 74, inclusive, will rest on the rails and then the molding apparatus may be moved through a tank of refrigerant, such as brine, until the contents thereof are frozen. The mold may then be removed from the brine and turned upside down, at which time the shields 50 may be depressed to thus press against and partially collapse the resilient members 39 forming the bottoms of the compartments 29 to eject the frozen ice cream sandwiches from the mold 10.

Now to further aid in forming ice cream sandwiches in a mold of this type I have provided a filling tray broadly designated at 85 having side walls 86 and 87 and end walls 88 and 89 secured to each other at their respective ends to form a substantially rectangular tray as shown. The walls 86 to 89, inclusive, are folded over at their upper edges to form a lip 90 which extends around the periphery of the tray 85. A bottom 91 is suitably secured, as by welding, to the lowermost edges of the walls 86 to 89, inclusive, and this bottom 91 has a plurality of openings 92 therein adapted to coincide with the openings 26 in the mold 10.

Opposed sides of each of the openings 92 has inwardly and downwardly bent angularly disposed flanges 93 and 94 integral therewith, said flanges being adapted to fit down into each of the compartments 29 when the tray 85 is placed in the mold 10. The filling tray 85 is also provided with suitable handles 95 and 96 secured to the inner surfaces of the end walls 88 and 89. The outer dimensions of the filling tray 85 are slightly less than the interior dimensions of the mold 10 to permit the filling tray 85 to fit snugly within the mold 10 as may be observed in Figures 1, 2 and 3.

It is thus seen that a plurality of wafers, not shown, may be placed in the mold 10 so that there will be two wafers in each compartment 29, disposed in spaced relation to each other, and then the filling tray 85 may be placed in position on the top of the mold 10 and then fluid or semi-fluid ice cream may be poured into the filling tray and may then be leveled out so that each compartment 29 will be filled. The flanges 93 and 94 on the filling tray will extend over the upper edges of the wafers in the compartment 29 to prevent ice cream from flowing between the wafers and the side walls 30 and 31 of the compartments 29 and to confine all ice cream placed within the compartments to the space between the two wafers. The filling tray 85 may then be removed from the mold and the contents of the mold may be frozen in the manner previously described or in any other suitable manner.

Any suitable means may be provided in the compartment 29 to hold the wafers in spaced relation to each other and three types of such means are illustrated in the present invention, the first comprising the projections 35 and 36 heretofore described.

Now referring to Figures 6 and 7, there will be observed a second or modified form of means for holding the wafers in spaced relation to each other, the rest of the structure being identical to the structure heretofore described and having the same reference characters. This modified means comprises a plurality of pins 100 secured to and projecting from the end walls 32 and 33. The pins 100 are spaced slightly apart from the side walls 30 and 31 of the compartment 29 so as to permit wafers to be disposed within the compartment 29 so that one side of the wafers will be disposed adjacent the walls 30 and 31 and the edges of the wafers will be held in this position by the pins 100 to permit ice cream to be placed between the wafers to form a sandwich in the manner heretofore described. Upon ejecting the sandwiches from the compartments, the pins 100 will cause small grooves to be formed in the frozen mass to give it an attractive appearance.

Now referring to Figures 8 and 9, there will be observed still another modified means for holding the wafers in spaced relation to each other within a compartment 29. This means comprises a substantially U-shaped sleeve member 101 formed of any suitable material such as metal, plastic, cardboard or the like and having a base portion 102 of substantially the same width as the interior width of the compartment 29 and this base portion 102 being provided with upwardly extending legs 103 and 104 secured to each end thereof, said legs 103 and 104 being of slightly less width than the interior width of said compartment 29 to form channels 106 and 107 between the outer edges of the legs 103 and 104 and the side walls 30 and 31 of the compartment 29. The legs 103 and 104 may, if desired, be provided with crimped portions 110 and 111 to further assist in holding the wafers in spaced relation to each other within the compartment 29. It is thus seen that by placing a sleeve 101 within the compartment 29, the wafers, not shown, may then be placed in the channels 106 and 107 and will be held in spaced relation to each other against the walls 30 and 31 of the compartment 29 by the legs 103 and 104 of the sleeve 101. The ice cream may then be added and the sandwich may be frozen in the manner heretofore described after which the slide member 50 may be depressed to eject the sandwich and the sleeve 101 from the compartment 29. The sleeve 101 may then be removed from the sandwich to permit the same to be packaged.

In the drawings and specification there has been set forth a preferred embodiment of the invention, and although specific terms are employed, they are used in a generic and descriptive sense only, and not for purposes of limitation, the scope of the invention being defined in the claims.

I claim:

1. Apparatus for forming frozen confections comprising a mold, said mold having a plurality of rigid compartments and each of said compartments having means therein for holding a pair of wafers in spaced relation to each other to permit ice cream to be placed between said wafers in each compartment, whereby the ice cream and the wafers may be frozen into a single unit confection, and means on said mold for removing said confections, thus formed, from the mold, said last-named means comprising each of said compartments having the lower portion thereof formed of resilient deformable material and each of said compartments having a shield telescopically mounted thereon and encasing the resilient portion thereof for deforming the resilient deformable portion of said compartments.

2. A mold for forming frozen ice cream sandwiches comprising a substantially rectangular tray having side walls and end walls and a bottom, said bottom having a plurality of openings therein, a plurality of substantially rectangular rigid compartments secured to said bottom and coinciding with said openings, each of said rectangular compartments having side walls and end walls, spacing projections on the end walls of each of said compartments for holding a pair of wafers in spaced relation to each other and against the side walls of the respective compartments, a deformable resilient cup-like member having side walls and end walls connected to the lower edges of the side and end walls of the rectangular compartments and having a bottom portion forming the bottom of said compartments, each of said compartments being provided with a shield slidably mounted on the outer surfaces of the compartment and encasing said resilient member to permit said shield to telescope relative to said compartment, whereby wafers may be placed within the compartment and ice cream in a pliable state may be placed between the wafers and frozen to a solid state and the resilient member may be partially deformed to eject the frozen sandwiches, thus formed, from the mold.

3. Apparatus for forming confections comprising a mold provided with a bottom having a plurality of substantially rectangular openings therein, a rigid open-ended compartment adapted to fit into each of said openings and depending from the bottom of said mold and being provided with side walls and end walls, said end walls having grooves adjacent opposed edges thereof at their juncture with the side walls for the reception of wafers and the like, a deformable resilient cup-like member having a bottom and side walls and end walls, the side walls and end walls of the resilient member being secured at their upper edges to the lowermost edges of the rigid compartment, the bottom of the resilient member serving to close the bottom of the rigid compartment and means for supporting the mold whereby a freezable ingredient may be poured into the compartments between said wafers to permit the mold to be moved manually through a refrigerant to freeze the freezable ingredient in the mold.

4. Apparatus for forming ice cream sandwiches and the like and being adapted to be placed on rails and moved manually through a refrigerant comprising a mold having side walls, end walls and a bottom, said bottom being provided with a plurality of substantially rectangular openings, an open-ended compartment adapted to fit in each of said openings and to depend from said bottom, each of said compartments having rigid side walls and end walls, a deformable resilient cup-like member forming a lower extension of said compartment and having side walls and end walls secured to and depending from the side walls and end walls of said compartment, said resilient cup-like member also having a bottom forming a bottom for said compartment, the end walls of the compartment having projections thereon spaced from the side walls of each compartment to form grooves adjacent the juncture of each side wall with the end walls whereby suitable wafers may be inserted in said grooves and a freezable fluid may be deposited between said wafers and on the resilient cup-like member after which the mold may be moved through a suitable refrigerant for freezing the contents of each compartment and whereby, upon the contents of each compartment having been frozen, the resilient bottom may be partially deformed for removing the contents of each of said compartments.

5. In a structure according to claim 4, a shield encasing each of the resilient cup-like members of said compartments and having a bottom portion enclosing said resilient bottom and having side portions slidably mounted on the rigid end walls of each compartment to permit the same to be telescoped relative to said compartment and said mold having means thereon to support said mold as it is propelled through a refrigerant and whereby, upon the contents of the mold having been frozen, the mold may be inverted and the shields may be telescoped relative to the compartments to engage and partially deform the resilient members for ejecting the contents of each compartment.

6. A mold for forming frozen ice cream sandwiches comprising a bottom portion having side walls and end walls and said bottom portion having a plurality of openings therein, a plurality of open-ended rigid compartments secured at their upper edges to said bottom portion and coinciding with said openings, each of said compartments having projecting means therein for holding a pair of wafers in spaced relation to each other and against the side walls of the respective compartments, a deformable resilient cup-like member having wall portions secured to the lower edges of each of said compartments and forming an extension of each of said compartments and also having a bottom forming the bottom of each of said compartments and each of said compartments being provided with a shield encasing said resilient member and having extensions slidably connected to the rigid portions of each compartment to permit said shield to telescope relative to said compartment, whereby wafers may be placed within each compartment and liquid ice cream may be placed between the wafers and frozen to a solid state and the resilient members may be partially deformed to eject the frozen sandwiches thus formed from the mold.

7. A mold for forming frozen ice cream sandwiches comprising a substantially rectangular bottom having side walls and end walls, said bottom having a plurality of openings therein, a plurality of open-ended rigid compartments secured to said bottom and coinciding with said openings, each of said compartments having spacing means therein for holding a pair of wafers in spaced relation to each other and against the side walls of the respective compartments, a deformable resilient cup-like member having wall portions secured to the lower edges of each of said compartments and forming an extension of each of said compartments and also having a bottom forming the bottom of said compartments and each of said compartments being provided with a shield encasing said resilient member and having extensions slidably connected to the rigid portions of each compartment to permit said shield to telescope relative to said compartment, whereby wafers may be placed within each compartment and ice cream may be placed between the wafers and frozen to a solid state and the resilient members may be partially deformed to eject the frozen sandwiches, thus formed, from the mold, said spacing means within each compartment comprising a removable slide member having a base and an upwardly extending leg secured to each end of said base, said base being of a size sufficient to cover the inner surface of the bottom of the compartment, and the edges of said upwardly extending legs being spaced apart from said side walls of the compartment to form grooves for the reception of said pair of wafers.

PORTER I. HENDERSON.

REFERENCES CITED

The following references are of record in the file of this patent:

UNITED STATES PATENTS

| Number | Name | Date |
|---|---|---|
| 1,088,498 | Westling | Feb. 24, 1914 |
| 1,790,626 | Menninger et al. | Jan. 27, 1931 |
| 1,844,066 | Hughes | Feb. 9, 1932 |
| 1,957,315 | Brimer | May 1, 1934 |
| 2,043,846 | Wise | June 9, 1936 |
| 2,108,233 | Pudlich | Feb. 15, 1938 |
| 2,146,236 | Stamp | Feb. 7, 1939 |
| 2,213,902 | Daniels | Sept. 3, 1940 |
| 2,243,363 | Thomas | May 27, 1941 |
| 2,248,651 | Von Losberg | July 8, 1941 |
| 2,433,211 | Gits | Dec. 23, 1947 |